United States Patent Office 3,367,261
Patented Feb. 6, 1968

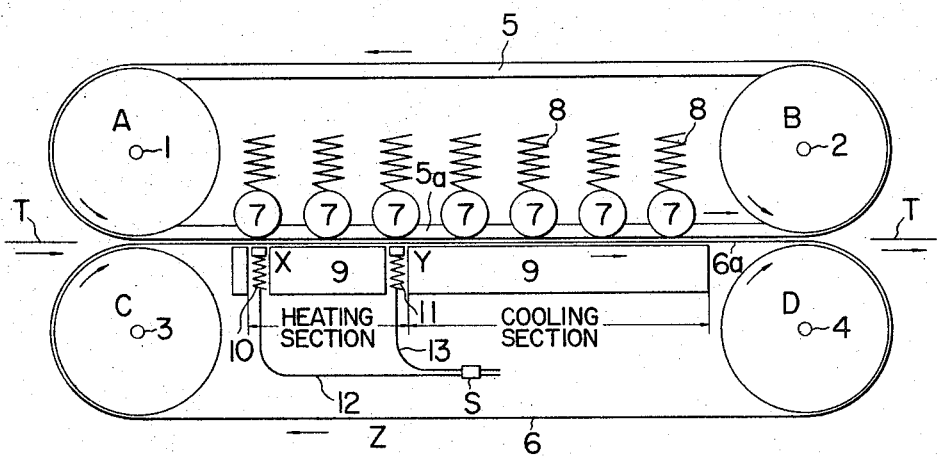

3,367,261
APPARATUS FOR CONTINUOUS HEAT-SEALING OF THERMOPLASTIC SHEETS
Kimifumi Kashiwagi, 36 1-chome, Minamisenju, Arakawa-ku, Tokyo-to, Japan
Filed Aug. 16, 1965, Ser. No. 479,918
1 Claim. (Cl. 100—93)

ABSTRACT OF THE DISCLOSURE

Apparatus for automatically heat-sealing thermoplastic sheets having two endless belts in face-to-face relation which are pressed together and a guide member under one belt having electric contacts towards the upstream junction of the belts and an extended cooling zone downstream of the belt.

---

This invention relates to an apparatus for automatically and continuously heat-sealing thermoplastic sheets to produce, for example, bags therefrom.

According to the present invention, there are provided means for continuously running an elastic endless belt of heat resisting and electrically insulating property and means for continuously running an endless electric resistance belt in face-to-face relation to said elastic belt in the same direction and at the same speed as said elastic belt. These belts are pressed against each other by presser means so as to make possible continuous feeding of thermoplastic sheets to be treated in a manner such that the sheets are grippped between the belts. Along and in sliding contact with the electric resistance belt there are disposed a pair of fixed electric contacts which are spaced from each other by a relatively short distance as compared with the length of the resistance belt and are located near the upstream meeting end of the two belts. Thus, when the contacts are connected to a power source, a portion of the resistance belt running between said contacts successively generates heat according to Joule's law sufficient to heat-seal the thermoplastic sheets running therewith, while the remaining portion of the resistance belt generates little heat since the remaining portion is much longer than the portion between the contacts.

A principal object of this invention is to provide an apparatus for heat-sealing thermoplastic sheets in an automatic and continuous manner and at a higher production rate than in conventional heat-sealing apparatus.

Another object of this invention is to provide a heat-sealing apparatus which may be operated at variable production rate according to requirement.

Still another object of this invention is to provide a heat-sealing apparatus which is operable with lower electric current than in conventional apparatuses and has a simple construction.

A further object of this invention is to provide a heat-sealing apparatus in which a cooling process subsequent to the heat sealing process may be carried out on a single belt line with heat-sealed thermoplastic sheets being firmly gripped between a pair of belts in the cooling process.

Other objects and features of this invention will be more fully understood from the following detailed description taken in connnection with the accompanying drawing, in which; the single figure shows a schematic view of a preferred embodiment of the invention.

Referring now to the drawing, the apparatus for continuously heat-sealing thermoplastic sheets according to the invention includes a first pair of pulleys A and B and a second pair of pulleys C and D. The pulleys A and B are spaced apart from each other and rotatable about axes 1 and 2, respectively. Likewise, the pulleys C and D are spaced from each other and rotatable about axes 3 and 4, respectively. The pulleys A and C and pulleys B and D are in opposed relation to each other and driven in the directions of respective arrows as shown by means of a suitable prime mover (not shown). These pulleys A, B, C and D are suitably supported in an electrically insulated manner.

The first pair of pulleys A and B have passed therearound an elastic endless belt 5 of resisting and electrically insulating property. This endless belt 5 travels in the direction of the arrow when the pulley A or B is driven and may be made of silicone rubber, for example.

The second pair of pulleys C and D have passed therearound an endless belt 6 of electric resistance material, which may be, for example, Nichrome (nickel-chromium alloy). This endless belt 6 travels in the direction of the arrow when the pulley C or D is driven.

Opposed straight spans $5_a$ and $6_a$ of the belts are in face-to-face relation and travel in the same direction and at the same speed.

Along the rear surface of the straight span $5_a$ of the belt 5, there are disposed a plurality of presser rolls 7 which are urged toward the straight span $6_a$ of the belt 6 by means of springs 8, and along the rear surface of the straight span $6_a$ of the belt 6, there are disposed a guide member 9 of heat resisting and electrically insulating property. The guide member 9 serves as a support for both straight spans $5_a$ and $6_a$ of the belts and has a smooth surface for guiding the traveling belts. Thus, it will be apparent that since the presser rolls 7 are urged toward the guide member 9, the straight spans of both belts are pressed between the member 9 and the rolls 7.

The guide member 9 has a pair of openings 10 and 11 in which electric contacts X and Y are disposed respectively. The contacts X and Y are always in sliding contact with the span $6_a$ of the belt 6. As shown, the contacts X and Y are located nearer to the pulleys A and C than to the pulleys B and D and the distance between the contacts is relatively small as compared with the length of the straight span $6_a$ of the belt 6. The contacts X and Y are connected to a power source S through conductors 12 and 13.

In the operation of the apparatus, the contacts X and Y are connected to the power source S and the pulleys are driven as shown by the arrows, while thermoplastic sheets T to be processed are fed between the pulleys A and C. When the contacts X and Y are connected to the power source S, electric current from the source may flow through the portion of the straight span $6_a$ between the contacts X and Y and also through the remaining portion X–Z–Y of the belt 6. However, since the remaining portion X–Z–Y is much longer than the portion of the span $6_a$ between the contacts X and Y, i.e., the electrical resistance of the remaining portion X–Z–Y is much higher than that of the portion between the contacts X and Y, a much greater part of the current supplied from the source S flows through the portion of the span $6_a$ between the contacts, which results in much greater Joule heat generated in the span $6_a$ between the contacts, with the remaining portion X–Z–Y generating negligibly little heat.

Under such a condition, the thermoplastic sheets T, when inserted between the pulleys A and C, are pressed between the straight spans $5_a$ and $6_a$ and carried therewith to be subjected to the heat generated between the contacts X and Y. As the sheets are pressed between the belts while they are subjected to the heat, they are securely heat-sealed. After passing through the heating section X–Y, the span $6_a$ of the belt 6 is cooled, with the result that the heat-sealed sheets placed between the belts are also cooled. The sheets, after passing through the cooling section, are discharged out from between the pulleys B and D. Thus, it is apparent that the heat-sealing and subsequent cooling are accomplished on a single feeding line and that a good impulse heat-sealing effect may be obtained by a continuous process.

In one example of practice, the diameter of the pulleys A, B, C and D was made 80 millimeters, and the distance between axes 1 and 2 and between 3 and 4 was made 300 millimeters. The Nichrome heating belt 6 was therefore 840 millimeters long. The distance between the contacts X and Y was 60 millimeters, and the heating belt 6 was 0.15 millimeter thick and 3.2 millimeters wide. Under these conditions, the span $6_a$ of the belt 6 between the contacts X and Y was sufficiently heated by a power supply below 150 watts, with negligible heat generation in the portion X–Z–Y.

In conventional impulse heat-sealing apparatuses, high electric current of 20 to 30 amperes is required even though it flows instantaneously, and this results in the necessity of using a complicated electric circuit including rectifiers, resistors, condensers, and other components. According to the present invention, however, a low electric current below 1.5 amperes at 100 volts is sufficient to effect satisfactory heat-sealing operation, and a complicated electric circuit is not required.

Another inherent disadvantage of conventional impulse heat-sealing techniques lies in the fact that at least 2 to 3 seconds are needed for the process including pressing, heat-sealing, cooling and delivery of sealed products. According to this invention, however, shortening of the time required for the sealing and cooling operation may be obtained without substantial limitation of the production rate because it is necessary only to increase the distance between the pulley axes to provide sufficient heating and cooling when a high feed rate of the sheets is required. The heat sealing system according to the invention may advantageously be combined with conveyor systems for feeding sheets to be treated and for delivering heat-sealed products.

While a preferred embodiment of the invention has been shown and described, it is to be understood that this invention may be modified or changed without departing from the spirit and scope of the invention as set forth in the appended claim.

What I claim is:

1. An apparatus for continuously heat-sealing thermoplastic sheets, comprising an elastic endless belt of heat resisting and electrically insulating property, including means for continuously running said elastic endless belt, an endless electric resistance belt in face-to-face relation to said elastic belt including means for continuously running said electric resistance belt in the same direction and at the same speed as said elastic belt, spring loaded roller means for pressing said belts against each other, guide means to make possible feeding thermoplastic sheets between said belts, including apertures therein, a pair of fixed electric contacts disposed in said guide means apertures in sliding contact with said electric resistance belt, said contacts being located near the upstream meeting end of said belts and spaced apart from each other by a relatively short distance as compared with the length of the face-to-face relation of said belts so as to define a heating section in said guide means, a power source connected to said contacts to heat the portion of said resistance belt traveling between said contacts thereby to subject the thermoplastic sheets being fed between said belts to heat-sealing operation when they are traveling between said contacts and, an elongated cooling section defined over an extended portion of said guide means downstream of said contacts.

References Cited
UNITED STATES PATENTS

| | | | |
|---|---|---|---|
| 2,556,008 | 6/1951 | Spalding | 100—93 |
| 2,711,781 | 6/1955 | Langer | 219—243 X |
| 2,800,162 | 7/1957 | Rohdin | 100—93 |
| 3,223,027 | 12/1965 | Soda et al. | 100—93 |

FOREIGN PATENTS

| | | |
|---|---|---|
| 955,618 | 4/1964 | Great Britain. |
| 978,815 | 12/1964 | Great Britain. |

LOUIS O. MAASSEL, *Primary Examiner.*